United States Patent
Grill et al.

(10) Patent No.: US 7,518,492 B2
(45) Date of Patent: *Apr. 14, 2009

(54) METHOD AND DEVICE FOR SIGNALING OF RELEVANT INFORMATION FOR THE OPERATION OF A MOTOR VEHICLE

(75) Inventors: Michael Grill, Stuttgart (DE); Mario Kustosch, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 128 days.

This patent is subject to a terminal disclaimer.

(21) Appl. No.: 10/523,346

(22) PCT Filed: Feb. 6, 2003

(86) PCT No.: PCT/DE03/00330

§ 371 (c)(1),
(2), (4) Date: Sep. 2, 2005

(87) PCT Pub. No.: WO2004/016471

PCT Pub. Date: Feb. 26, 2004

(65) Prior Publication Data

US 2006/0109098 A1  May 25, 2006

(30) Foreign Application Priority Data

Aug. 1, 2002  (DE) .............................. 102 35 165

(51) Int. Cl.
*B60Q 1/00* (2006.01)
(52) U.S. Cl. ...................................... 340/439; 340/442
(58) Field of Classification Search ................. 340/439; 364/424.04, 442, 431.01
See application file for complete search history.

(56) References Cited

U.S. PATENT DOCUMENTS 4,510,906 A * 4/1985 Klatt ........................... 123/396
2006/0109097 A1* 5/2006 Grill et al. ................... 340/439

FOREIGN PATENT DOCUMENTS

DE  32 32 160  3/1984
EP  0 633 155  1/1995

* cited by examiner

*Primary Examiner*—Daniel Wu
*Assistant Examiner*—Shirley Lu
(74) *Attorney, Agent, or Firm*—Kenyon & Kenyon LLP

(57) ABSTRACT

Described are a method and a device for signaling information relevant for the operation of a motor vehicle which make it possible for the vehicle's driver to receive information about the vehicle's optimum engine efficiency. The specified information is thus formed by an operating point of a drive unit of the vehicle. A haptic signal is formed at a control element of the vehicle, an accelerator pedal in particular, as a function of the operating point.

18 Claims, 2 Drawing Sheets

METHOD AND DEVICE FOR SIGNALING OF RELEVANT INFORMATION FOR THE OPERATION OF A MOTOR VEHICLE

FIELD OF THE INVENTION

The present invention is directed to a method and a device for signaling information relevant for the operation of a motor vehicle.

BACKGROUND INFORMATION

Methods and devices for signaling information relevant for the operation of a motor vehicle are already known. A visual consumption indicator, for example, is standard in many vehicles and encourages awareness of economical driving. The visual consumption indicator displays the instantaneous fuel consumption value. In this way, different fuel consumption values may be visually displayed on the consumption indicator.

The driver's driving manner represents a great potential for fuel savings. Most drivers are not aware of the physical causes for high consumption, or information is lacking which is necessary for optimum driving, the instantaneous engine efficiency for example.

SUMMARY OF THE INVENTION

The method and device according to the present invention for signaling have the advantage over the related art that information relevant for the operation of the motor vehicle is formed by an operating point of a drive unit of the vehicle, and that, as a function of the operating point, a haptic signal is formed at a control element of the vehicle, an accelerator pedal in particular. Information about fuel consumption-minimizing driving may be conveyed to the driver in this way. In addition, the haptic signal on the control element has the advantage that the driver does not have to avert his/her eyes from the roadway. As a result, the driver is not distracted from traffic. Therefore, the haptic signal does not represent a safety risk and does not increase the risk of an accident. If the control element is one which the driver constantly operates, for example the accelerator pedal, it is also ensured that the driver is able to constantly monitor information about the drive unit's operating point. If the control element is the accelerator pedal, the haptic signal of the drive unit's operating point may, via the accelerator pedal, directly prompt the driver to drive in a fuel consumption-minimizing manner by changing the accelerator pedal position, thus causing a change in the haptic signal.

It is particularly advantageous if an optimum operating point of the drive unit, optimum engine efficiency in particular, is indicated by the haptic signal. The driver is enabled in this way to drive or to accelerate with optimum engine efficiency or an optimum operating point of the drive unit, thus minimizing fuel consumption.

It is particularly advantageous if haptic signaling starts approximately when the optimum operating point is reached. In this way, the driver may very precisely adapt his/her driving manner to the optimum operating point of the drive unit and may thus operate the vehicle with minimized fuel consumption. If the control element is designed as an accelerator pedal, the driver may then directly use the information about the optimum operating point for his/her driving manner by constantly driving within the range of the occurring haptic signal at the accelerator pedal.

It is particularly advantageous if the haptic signal is formed via a restoring force acting on the control element. It is ensured in this way that the driver notices the haptic signal when operating the control element. Furthermore, if the control element is designed as an accelerator pedal, driving with the optimum operating point of the drive unit is made easier for the driver. The restoring force, occurring when the optimum operating point is reached, makes it easier for the driver to maintain the optimum operating point of the drive unit during operation of the accelerator pedal.

DETAILED DESCRIPTION

Figure 1:
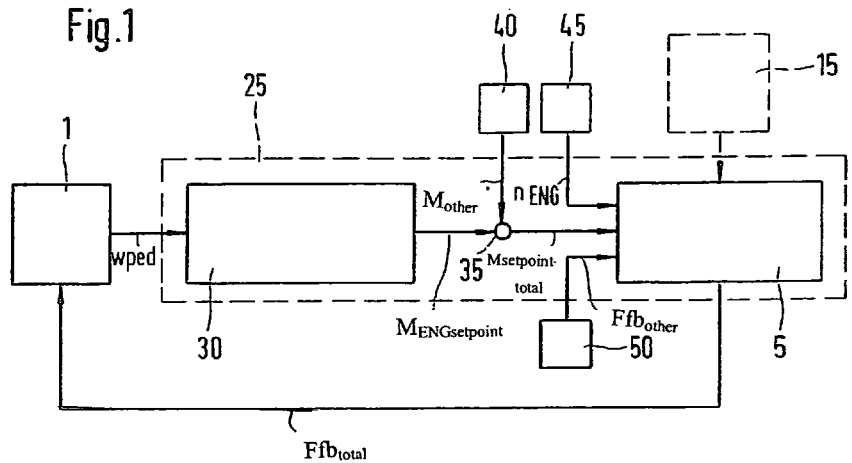
FIG. 1 shows a block diagram including the device according to the present invention.

In FIG. 1, reference numeral 25 indicates a controller of a motor vehicle having a drive unit which may include, for example, a gasoline engine, a diesel engine, an electric motor, or the like, or which is based on any other alternative drive concept. Furthermore, the vehicle includes a control element 1, which is designed as an accelerator pedal for example. Controller 25 includes a driver intent interpretation unit 30 which is connected to accelerator pedal 1. From position wped of acceleration pedal 1 operated by the driver, driver intent interpretation unit 30 determines a setpoint value of an output variable of the drive unit. This output variable may be, for example, an engine output torque, or a wheel output torque, or an output power, or an output variable derivable from the mentioned variables. It should be assumed in the following that the output variable of the drive unit is an engine output torque. In a manner known to those skilled in the art, driver intent interpretation unit 30 thus forms a setpoint value $M_{ENGsetpoint}$ for the engine output torque of the drive unit from position wped of accelerator pedal 1. Setpoint value $M_{ENGsetpoint}$, formed as a function of the driver's intent, is supplied to a first adding element 35 and added there to a resulting torque request $M_{other}$ which is formed by a coordinator 40 as a function of the other torque requests. The other torque requests may be initiated, for example, for compensating the torque demands of vehicle auxiliaries, such as an air conditioning system, a car radio, a servo motor, or an idling regulation. Coordination of these other torque requests in coordinator 40 also takes place in a manner known to those skilled in the art. The sum formed by first adding element 35 is a resulting total setpoint value $M_{setpointtotal}$ which is supplied to a device 5 according to the present invention. Device 5 is used for haptic signaling at control element 1, acceleration pedal 1 in this example. This haptic signaling may take place by generating a suitable restoring force at accelerator pedal 1, for example. An instantaneous speed $n_{ENG}$ of an engine driving the drive unit, which may be as described a gasoline engine, a diesel engine, or an electric motor, is supplied to device 5 by an engine speed sensor 45. A coordinator 50 for other restoring force requests on accelerator pedal 1 may optionally be provided and forms a resulting restoring force request Ffbother for these other restoring force requests. This could be, for example, a haptic response for maintaining a safety distance. Resulting restoring force request Ffbother is also supplied to device 5. In addition, an input unit 15, indicated in FIG. 1 in dashed form, may also be optionally provided. For example, the driver may preselect one or multiple fuel consumption values at input unit 15. These values are also supplied to device 5. According to FIG. 1, controller 25 includes driver intent interpretation unit 30, first adding element 35, and device 5. Controller 25 may be implemented, for example, in the form of hardware and/or software, the software being able to be executed by a microchip.

Device 5 determines a resulting total restoring force Ffbtotal from the supplied input variables and controls acceleration pedal 1 for setting this resulting total restoring force Ffbtotal. This may be implemented in a manner known to those skilled in the art via an actuator (not shown in FIG. 1), which is electronically controlled by device 5, for setting a spring force which acts against the operating direction of accelerator pedal 1.

As an example, it should be assumed in the following considerations that the vehicle is driven by an internal combustion engine, i.e., a gasoline engine or a diesel engine for example. However, the considerations are generally directed at the vehicle's power consumption. During acceleration, the fuel consumption corresponds to the power necessary for overcoming the vehicle's mass inertia. The fuel consumption during acceleration may be minimized in that the engine is held at the most favorable operating point by the driver using a defined accelerator pedal position; according to the present invention, this accelerator pedal position should be indicated to the driver via a haptic signal at accelerator pedal 1.

Figure 2:
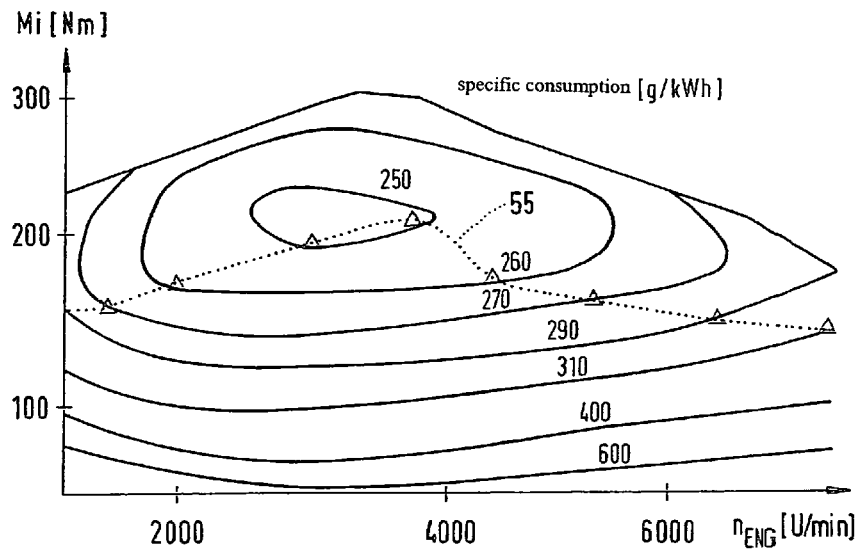
FIG. 2 shows a characteristics map for determining a specific fuel consumption of a motor vehicle.

FIG. 2 shows what is known as a shell characteristics map of an internal combustion engine in which the engine's output torque, indicated torque Mi, is applied in Nm above the engine speed $n_{ENG}$ in U/min. Indicated torque Mi and engine speed $n_{ENG}$ establish a characteristics map for a specific fuel consumption of the vehicle in g/kWh in which isolines for this specific fuel consumption are indicated in the indicated unit. The characteristics map may be determined on an engine test bench in that, by predefining engine speed $n_{ENG}$ and the load, which is implemented, for example, using an eddy-current brake which is connected to the engine's crankshaft, the ratio from the consumed fuel quantity and performed mechanical work at the crankshaft is determined. This ratio is referenced as Be. Ratio Be is the specific fuel consumption. According to FIG. 2, the specific fuel consumption Be is then applied over the engine speed and indicated torque Mi which represents the load varied by the eddy-current brake in a manner known to those skilled in the art. Indicated torque Mi may be determined as a mean value for the respective braking effect of the eddy-current brake over a predefined time. Connecting all points in the characteristics map which have approximately the same specific fuel consumption Be results, as indicated in FIG. 2, in shell-shaped isolines or contour lines for which this characteristics map is named.

Figure 3:
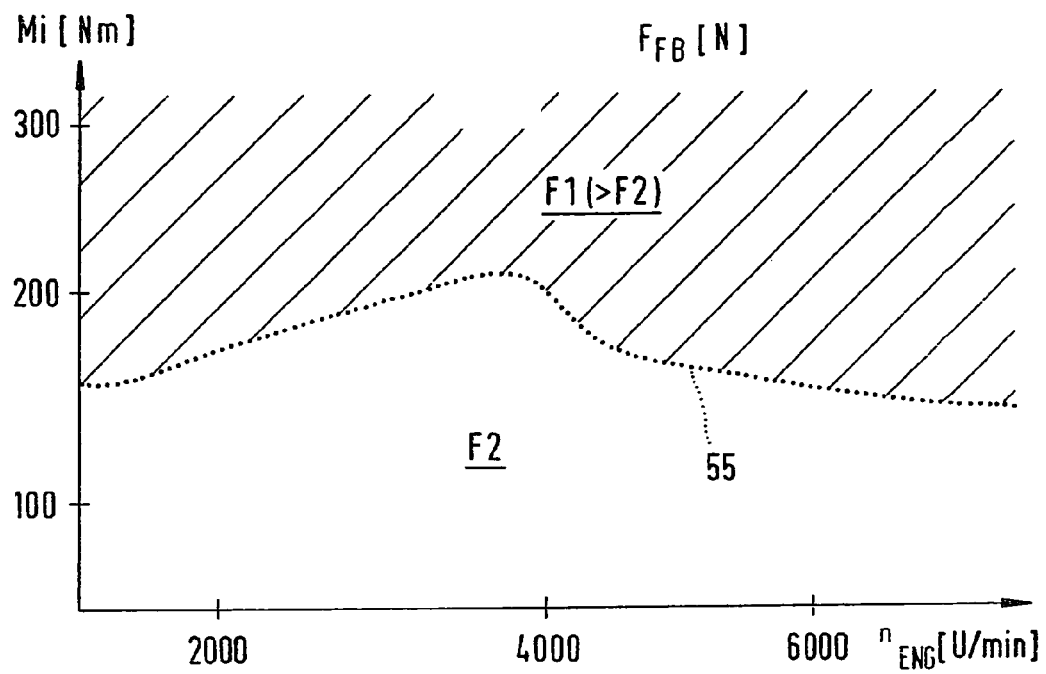
FIG. 3 shows a characteristics map for determining a restoring force for an acceleration pedal of the vehicle.

For each engine speed $n_{ENG}$ there is exactly one minimum specific fuel consumption Be and thus exactly one optimum efficiency. The points with the minimum specific fuel consumption for different engine speeds $n_{ENG}$ are indicated in FIG. 2 by triangles. Connecting the points with the minimum specific fuel consumption to one another results in the dotted line in FIG. 2 which is indicated by reference numeral 55. This line 55 is also referred to in the following as the line of the minimum specific fuel consumption. FIG. 3 shows a characteristics map in which the curve of a haptic signal $F_{FB}$ and thus a restoring force for acceleration pedal 1 is applied in N above engine speed $n_{ENG}$ in U/min on the abscissa and indicated engine torque Mi in Nm on the ordinate. The curve of this haptic signal $F_{FB}$ arises from the dotted line 55 of the minimum specific fuel consumption according to FIG. 2 in which the areas above and below this line 55 are separated from one another by different values of restoring force $F_{FB}$. In particular, these values may be two different values, namely a first restoring force F1 above line 55 of the minimum specific fuel consumption and a second restoring force F2 below this line 55, first restoring force F1 being able to be greater than second restoring force F2 and second restoring force F2 being able to be equal to zero, for example. This makes it possible to signal to the driver, via an increase in restoring force $F_{FB}$ at accelerator pedal 1, the optimum operating point of the drive unit and thus the optimum engine efficiency. In the event that, as described, first restoring force F1 is greater than second restoring force F2 and second restoring force F2 is equal to zero, the optimum engine efficiency occurs for the accelerator pedal position at which the driver, while operating accelerator pedal 1, notices a corresponding increase in the resistance and thus in the restoring force.

Figure 4:
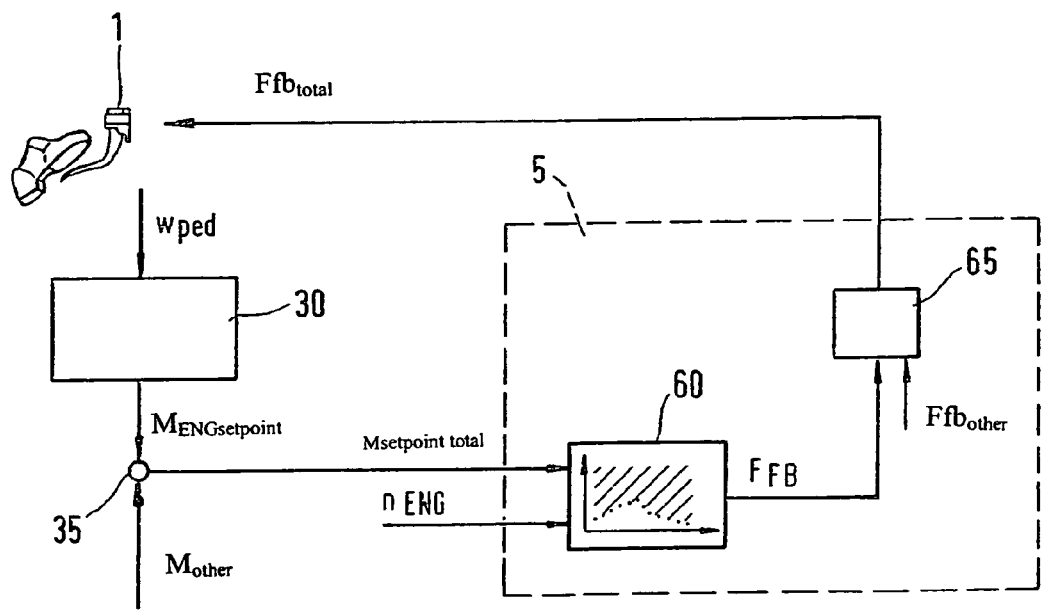
FIG. 4 shows a function chart for demonstrating the operating mode of the device and method according to the present invention.

FIG. 4 shows a function chart for demonstrating the operating mode of device 5 according to the present invention and the method according to the present invention. In FIG. 4, the same reference numerals indicate the same elements as in FIG. 1. In contrast to the block diagram in FIG. 1, the configuration of device 5 according to the present invention is additionally explained in greater detail in FIG. 4. Device 5, which, for example, may be implemented as a software structure on a microchip, includes a characteristics map function 60 which implements the shell characteristics map from FIG. 2 and to which resulting total setpoint torque Msetpointtotal released from adding element 35 and instantaneous engine speed $n_{ENG}$ are supplied as input variables. Hence, characteristics map function 60 determines haptic signal $F_{FB}$ as an output variable in that a check is performed to determine whether the operating point, formed by instantaneous engine speed $n_{ENG}$ and resulting total setpoint torque Msetpointtotal, is above or below line 55 of the minimum specific fuel consumption. If the operating point is above line 55 then $F_{FB}$ equals F1, otherwise $F_{FB}$ equals F2. Haptic signal $F_{FB}$ is supplied to a maximum selector element 65 to which the resulting restoring force request $F_{fbother}$ of the other restoring force requests is additionally supplied by restoring force coordinator 50. Maximum selector element 65 selects the maximum from the supplied variables and releases it as resulting haptic signal Ffbtotal to accelerator pedal 1 for setting the respective restoring force. Using maximum selector element 65, the restoring force at accelerator pedal 1 is limited to the downside to ensure that, after release, the accelerator pedal returns to its original position.

The method according to the present invention and device 5 according to the present invention make it possible for the driver, due to the haptic signal at accelerator pedal 1, to accelerate and to run the engine with optimum efficiency. In addition, in contrast to a visual indicator, a haptic signal at accelerator pedal 1 is constantly present in the driver's awareness, is not irritating, and does not distract from traffic.

What is claimed is:

1. A method for signaling information relevant for an operation of a motor vehicle, comprising:

forming the information using an operating point of a drive unit of the motor vehicle;

forming a haptic signal at a control element of the motor vehicle as a function of the operating point, wherein an optimum operating point of the drive unit is indicated by the haptic signal; and determining the optimum operating point as a function of a setpoint value for an output variable output by the drive unit and as a function of an instantaneous operating variable of the drive unit;

wherein the setpoint value for the output variable includes one of a setpoint torque, a setpoint power. and an output variable derivable from at least one of the setpoint torque and the setpoint power.

2. The method as recited in claim 1, wherein the control element includes an accelerator pedal.

3. The method as recited in claim 1, wherein the optimum operating point includes an optimum engine efficiency.

4. The method as recited in claim 1, wherein the set point value for the output variable includes a setpoint torque.

5. The method as recited in claim 1, wherein the instantaneous operating variable includes an engine speed.

6. The method as recited in claim 1, further comprising:
determining the output variable as a function of a position of the control element.

7. The method as recited in claim 1, wherein a haptic signaling starts approximately when the optimum operating point is reached.

8. The method as recited in claim 1, further comprising:
forming the haptic signal by a restoring force acting on the control element.

9. A device for signaling information relevant for an operation of a motor vehicle, comprising:
an arrangement for forming the information by using an operating point of a drive unit of the motor vehicle;
an arrangement for forming a haptic signal at a control element of the motor vehicle as a function of the operating point, wherein an optimum operating point of the drive unit is indicated by the haptic signal; and
an arrangement for determining the optimum operating point as a function of a setpoint value for an output variable output by the drive unit and as a function of an instantaneous operating variable of the drive unit;
wherein the setpoint value for the output variable includes one of a setpoint torque, a setpoint power, and an output variable derivable from at least one of the setpoint torque and the setpoint power.

10. The device as recited in claim 9, wherein the control element includes an accelerator pedal, and wherein the optimum operating point includes an optimum engine efficiency.

11. A device for signaling information relevant for an operation of a motor vehicle. comprising:
an arrangement for forming the information by an operating point of a drive unit of the motor vehicle;
an arrangement for forming a haptic signal at a control element of the motor vehicle as a function of the operating point. wherein an optimum operating point of the drive unit is indicated by the haptic signal; and
an arrangement for determining the optimum operating point as a function of a setpoint value for an output variable output by the drive unit and as a function of an instantaneous operating variable of the drive unit;
wherein the setpoint value of the output variable includes a setpoint torque.

12. A device for signaling information relevant for an operation of a motor vehicle. comprising:
an arrangement for forming the information by an operating point of a drive unit of the motor vehicle;
an arrangement for forming a haptic signal at a control element of the motor vehicle as a function of the operating point. wherein an optimum operating point of the drive unit is indicated by the haptic signal; and
an arrangement for determining the optimum operating point as a function of a setpoint value for an output variable output by the drive unit and as a function of an instantaneous operating variable of the drive unit;
wherein the control element includes an accelerator pedal, wherein the optimum operating point includes an optimum engine efficiency, wherein the setpoint value of the output variable includes a setpoint torque, and wherein the instantaneous operating variable includes an engine speed.

13. A device for signaling information relevant for an operation of a motor vehicle. comprising:
an arrangement for forming the information by an operating point of a drive unit of the motor vehicle;
an arrangement for forming a haptic signal at a control element of the motor vehicle as a function of the operating point. wherein an optimum operating point of the drive unit is indicated by the haptic signal;
an arrangement for determining the optimum operating point as a function of a setpoint value for an output variable output by the drive unit and as a function of an instantaneous operating variable of the drive unit; and
a determining arrangement to determine the output variable as a function of a position of the control element;
wherein the control element includes an accelerator pedal, wherein the optimum operating point includes an optimum engine efficiency, wherein the setpoint value of the output variable includes a setpoint torque, and wherein the instantaneous operating variable includes an engine speed.

14. The method as recited in claim 1, wherein the control element includes an accelerator pedal, and wherein the optimum operating point includes an optimum engine efficiency.

15. A method for signaling information relevant for an operation of a motor vehicle. comprising:
forming the information by an operating point of a drive unit of the motor vehicle; forming a haptic signal at a control element of the motor vehicle as a function of the operating point. wherein an optimum operating point of the drive unit is indicated by the haptic signal; and
determining the optimum operating point as a function of a setpoint value for an output variable output by the drive unit and as a function of an instantaneous operating variable of the drive unit;
wherein the setpoint value of the output variable includes a setpoint torque, and wherein the instantaneous operating variable includes an engine speed.

16. A method for signaling information relevant for an operation of a motor vehicle, comprising:
forming the information by an operating point of a drive unit of the motor vehicle; forming a haptic signal at a control element of the motor vehicle as a function of the operating point, wherein an optimum operating point of the drive unit is indicated by the haptic signal; and
determining the optimum operating point as a function of a setpoint value for an output variable output by the drive unit and as a function of an instantaneous operating variable of the drive unit;
wherein the control element includes an accelerator pedal, wherein the optimum operating point includes an optimum engine efficiency, wherein the setpoint value of the output variable includes a setpoint torque, and wherein the instantaneous operating variable includes an engine speed.

17. A method for signaling information relevant for an operation of a motor vehicle, comprising:

forming the information by an operating point of a drive unit of the motor vehicle; forming a haptic signal at a control element of the motor vehicle as a function of the operating point. wherein an optimum operating point of the drive unit is indicated by the haptic signal;

determining the optimum operating point as a function of a setpoint value for an output variable output by the drive unit and as a function of an instantaneous operating variable of the drive unit; and determining the output variable as a function of a position of the control element;

wherein the control element includes an accelerator pedal, wherein the optimum operating point includes an optimum engine efficiency, wherein the setpoint value of the output variable includes a setpoint torque, and wherein the instantaneous operating variable includes an engine speed.

18. The device as recited in claim 9, wherein the instantaneous operating variable includes an engine speed.

* * * * *